United States Patent [19]

Grimsley

[11] Patent Number: 4,959,165
[45] Date of Patent: Sep. 25, 1990

[54] WELL COMPLETION AND SERVICING FLUID

[75] Inventor: R. Leroy Grimsley, Ponca City, Okla.

[73] Assignee: Conoco Inc., Ponca City, Okla.

[21] Appl. No.: 263,841

[22] Filed: Oct. 28, 1988

[51] Int. Cl.$^5$ .................... E21B 33/13; E21B 43/11
[52] U.S. Cl. ................................................ 252/8.551
[58] Field of Search ................................... 252/8.551

[56] References Cited

U.S. PATENT DOCUMENTS

| | | | |
|---|---|---|---|
| 2,055,666 | 2/1936 | Moore et al. | 252/8.515 |
| 2,099,825 | 11/1937 | Rolshausen et al. | 252/8.515 |
| 3,007,865 | 11/1961 | Priest | 252/8.551 |
| 4,190,110 | 2/1980 | Beirute | 166/291 |
| 4,276,182 | 6/1981 | Beirute | 252/8.55 R |
| 4,422,947 | 12/1983 | Dorsey et al. | 252/8.5 C |
| 4,490,262 | 12/1984 | Stauffer et al. | 252/8.551 |

Primary Examiner—Matthew A. Thexton
Assistant Examiner—Chhaya Sayala
Attorney, Agent, or Firm—Richard W. Collins

[57] ABSTRACT

A well completion and servicing fluid comprising an aqueous solution of calcium chloride containing a viscosifier and zinc and/or zinc oxide as a weighting agent.

4 Claims, No Drawings

WELL COMPLETION AND SERVICING FLUID

BACKGROUND OF THE INVENTION

This invention relates to well completion and servicing fluids, and more particularly to well completion and servicing fluids that are noncorrosive, free of solids which are not soluble in hydrochloric acid, and capable of being formulated at densities greater than 22 pounds per gallon.

In the completion and/or servicing of oil and gas wells, it is often desirable to contain the formation pressure by employing a column of fluid in the well. Well completion and servicing fluids may be used during squeezing operations, perforation operations, well shut-ins, gravel packing or other completion operations. Many completion and servicing fluids have been used for this purpose. These include, for example, drilling mud, brine, and solutions of zinc or calcium chlorides or bromides. These fluids have been successful to varying degrees, but are subject to certain disadvantages and limitations. Drilling muds are not completely satisfactory because solids contained in the muds frequently tend to plug the formation. Although solutions of certain inorganic salts tend to be particle-free, there are other difficulties with their use as well-servicing fluids. For example, most inorganic salt solutions commonly used in wells in the Gulf Coast region of the United States are low density fluids having high crystallization temperatures. For instance, sodium chloride-based fluids have a density of up to about 9.8 pounds per gallon (ppg); solutions of calcium chloride have a density of up to about 11.7 ppg; solutions of calcium chloride and zinc chloride have a density of up to about 14.0 ppg; and solutions of $CaCl_2$ and $CaBr_2$ have densities of up to about 15.1 ppg.

In recent years, deeper, high-pressure wells have resulted in a need for well-servicing fluids having higher densities than are currently available. This is particularly true of wells in the Gulf of Mexico. There, treatment of high-pressure wells often requires well-servicing fluids having densities in excess of 15 pounds per gallon and crystallization points below about 50° F. Recently, fluids comprised of $CaBr_2$ and $ZnBr_2$ have been developed that have a density of from about 15 to 20 ppg. However, these fluids are very expensive and very corrosive.

Thus, there has been a continuing need for well completion and servicing fluids that can be formulated at high densities, such as greater than 15 ppg, but which are not subject to the disadvantages of the presently available fluids.

SUMMARY OF THE INVENTION

In accordance with the present invention, well completion and servicing fluids which can be formulated at densities greater than 15 ppg, which are not highly corrosive, and which do not permanently damage the formation, have been developed.

The well completion and servicing fluids in accordance with this invention are aqueous solutions of calcium chloride containing a viscosifier plus zinc and/or zinc oxide as a weighting agent. As used herein, the term "well completion and servicing fluids" is intended to include suspensions containing undissolved solids such as the zinc and/or zinc oxide weighting agents.

The calcium chloride solution is not as highly corrosive as sodium chloride solutions or calcium and/or zinc bromide solutions. The zinc or zinc oxide weighting agents are easily removed from the surface of the formation by treatment with hydrochloric acid, so that the formation is not permanently damaged. The combination of dissolved calcium chloride and suspended zinc and/or zinc oxide enables formulation of fluids having densities of substantially greater than 15 ppg.

It is therefore an object of this invention to provide well completion and servicing fluids which are not highly corrosive, which do not permanently damage the formation, and which can be formulated at high density.

DESCRIPTION OF THE PREFERRED EMBODIMENTS

The well completion and servicing fluids provided by this invention are comprised of an aqueous solution of calcium chloride containing a viscosifier and a weighting agent.

The aqueous calcium chloride solution contains up to 7.5 pounds of calcium chloride per gallon of solution, depending primarily on the desired density of the end product fluid.

The viscosifier may be any of the widely used cellulosic thickeners, preferably hydroxyethylcellulose or its equivalent. The amount of viscosifier is in large part determined by the amount of weighting agent employed.

The zinc and/or zinc oxide weighting agent is preferably used in powdered form, and the amount used depends on the desired density of the end product fluid.

The well completion and servicing fluids in accordance with the invention, in addition to the essential calcium chloride, viscosifier, and zinc and/or zinc oxide weighting agent, may include other materials such as corrosion inhibitors, surfactants, etc., but should not contain a significant amount of bromide ions as bromide ions impart undesirable corrosivity to the fluids.

The well completion and servicing fluids in accordance with the invention can be formulated at densities from slightly greater than that of water to as high as about 33 ppg. Since there are many alternatives available for fluids having a density below about 15 ppg, the preferred fluids in accordance with the invention are those having a density of greater than about 15 ppg. Presently, well completion and servicing fluids having densities greater than about 15 ppg contain high levels of bromide ions with resulting corrosion problems.

The fluids in accordance with the invention are comprised, per gallon of fluid, of from about 0.5 to about 7.5 pounds of calcium chloride, of sufficient viscosifier to provide fluid loss control and to suspend the weighting agent, and of from about 2 to about 30 pounds of zinc and/or zinc oxide. The fluids are substantially free of bromide ions and free of suspended solids which are not removable from the formation face by treatment with hydrochloric acid. The fluids are preferably formed by blending the viscosifier and weighting agent into a calcium chloride solution and mixing to obtain a uniform composition.

Examples of high density fluids in accordance with the invention, without the viscosifier, are described in Table 1 below. These fluids were prepared by mixing various amounts of zinc and/or zinc oxide with a calcium chloride solution containing 42.6 percent by weight calcium chloride and 57.4 percent by weight water. The calcium chloride solution had a measured density of 11.66 pounds per gallon.

TABLE 1

| Ingredient | Percent by Weight | | | | | | |
|---|---|---|---|---|---|---|---|
| Zn | 0 | 12.0 | 24.3 | 37.8 | 70.7 | 72.9 | 77.4 |
| ZnO | 56.5 | 46.2 | 38.6 | 29.7 | 11.0 | 5.6 | 0 |
| CaCl$_2$ Solution | 43.5 | 41.8 | 37.1 | 32.5 | 18.3 | 21.5 | 22.6 |
| Measured Density* | 20.0 | 21.1 | 22.8 | 24.4 | 33.0 | 31.5 | 30.9 |

*Pounds per Gallon

EXAMPLE 1

In this example, mild steel corrosion coupons were suspended overnight in two fluids comprised of zinc, zinc oxide and calcium chloride solution. The coupons were washed briefly with hydrochloric acid to remove the zinc compounds, and the corrosion rates were determined to be about one mil per year. Fluids comprised of calcium and/or zinc bromide and having similar densities are very corrosive compared to the fluids in accordance with this invention.

I claim:
1. A well completion and servicing fluid for controlling formation pressure during completion or servicing of a well, said fluid consisting essentially of:
    (a) an aqueous solution of calcium chloride,
    (b) a solid weighting agent suspended in said solution and being selected from the group consisting of zinc, zinc oxide, and mixtures thereof; and
    (c) a viscosifier dissolved in said solution in an amount effective to suspend said weighting agent;
    said fluid having a density of greater than 15 pounds per gallon and being substantially free of bromide ions and being substantially free of solid material which is not soluble in hydrochloric acid.
2. The fluid of claim 1 wherein said calcium chloride is present in an amount of from about 0.5 to about 7.5 pounds per gallon of solution.
3. The fluid of claim 2 wherein said viscosifier is hydroxyethylcellulose.
4. The fluid of claim 3 wherein said weighting agent is present in an amount of from about 2 to about 30 pounds per gallon of fluid.

* * * * *